United States Patent [19]

Peter et al.

[11] 4,243,186

[45] Jan. 6, 1981

[54] LOW PROFILE MAGNETIC TAPE DRIVE WITH VACUUM ACTUATED AUTO-THREADING

[75] Inventors: Jack Peter, La Jolla; Karl B. Offerman, San Diego; Larry D. Brown, Del Mar; Derek J. Stone, San Diego, all of Calif.

[73] Assignee: Cipher Data Products, Incorporated, San Diego, Calif.

[21] Appl. No.: 78,845

[22] Filed: Sep. 25, 1979

[51] Int. Cl.³ .................... G03B 1/04; G11B 15/32
[52] U.S. Cl. ................... 242/195; 226/91; 226/97; 242/68.3
[58] Field of Search ............... 242/182–185, 242/195, 68–68.2, 68.3, 46.2–46.5; 226/95, 97

[56] References Cited
U.S. PATENT DOCUMENTS

| | | | |
|---|---|---|---|
| 3,233,841 | 2/1966 | Neff | 242/68.3 |
| 3,712,561 | 1/1973 | Williams | 242/68.3 |
| 3,761,035 | 9/1973 | Wang | 242/182 |
| 3,801,033 | 4/1974 | Sanderson | 242/68.3 |
| 3,863,863 | 2/1975 | Ende | 242/182 |

OTHER PUBLICATIONS

Wangco–Incorporated Product Description, #202595A–776, published 9/76.

*Primary Examiner*—Leonard D. Christian
*Attorney, Agent, or Firm*—Brown & Martin

[57] ABSTRACT

Supply and take-up reels are mounted above a horizontal base for selective powered rotation about respective vertical axes. Vertical guide surfaces and a cover panel define an air tight continuous flowpath extending between the peripheries of the reels past a read/write head. A blower mounted in a hood structure beneath the base sucks air through the flowpath and through a perforated center spool of the take-up reel. A river of air thus pulls and guides the free end portion of the magnetic tape from the supply reel to the take-up reel as the supply reel is rotated by a drive motor to unwind the tape therefrom. The supply hub is adapted to automatically center the supply reel thereon. The supply hub further includes a plurality of annularly spaced reel engaging pawls mounted in, and normally retracted into the hub, and an over-center actuating means for selectively extending the pawls through differential rotation of a pair of separate rotors included in the hub.

10 Claims, 13 Drawing Figures

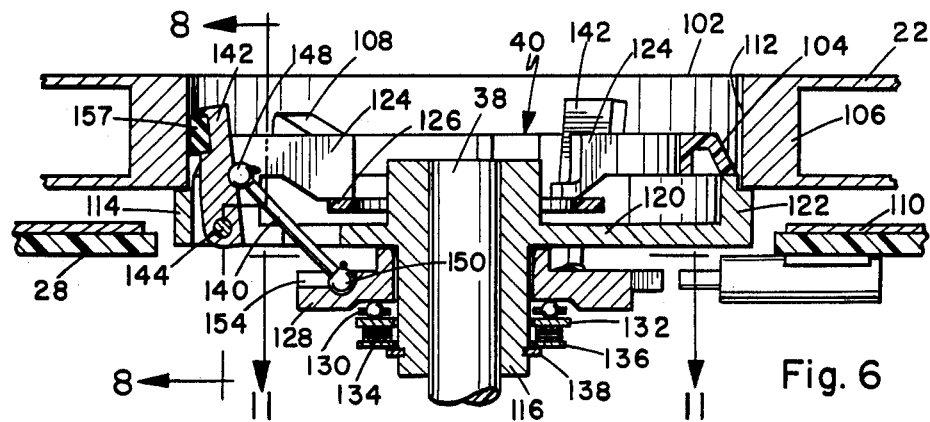

LOW PROFILE MAGNETIC TAPE DRIVE WITH VACUUM ACTUATED AUTO-THREADING

BACKGROUND OF THE INVENTION

The present invention relates to magnetic tape drives such as those utilized with computers and other data processing equipment. More particularly the present invention relates to a magnetic tape drive which has a low profile configuration and in which the supply reel can be loaded through a front slot. The supply reel is automatically centered and secured on the supply hub and the free end of the tape is automatically threaded and secured to the take-up reel by vacuum action.

Magnetic tape drives have long been used for storage and retrieval of information, particularly in connection with high speed digital computers. The tape supply reel is normally secured on a supply hub and the free end of the tape is threaded along a predetermined path over a read/write head. The tape end is then secured to a take-up reel mounted on a take-up hub. The supply and take-up hubs have individual drive motors. In response to various commands sent to the magnetic tape drive, the reels are simultaneously rotated clockwise or counter-clockwise so that various blocks of data on the tape may be read or written by the head.

Generally, in order to facilitate loading of a magnetic tape drive, that is the placement of the supply and take-up reels on their respective hubs and the threading of the tape from one reel to the other, magnetic tape drives are usually installed in an upright position, the reels and head assembly being exposed for access. Such tape drives have several drawbacks. First of all, they require a considerable amount of space and this limits the packaging arrangement in many instances. Since the reels and head assembly are exposed, it is usually necessary to improve the overall appearance of the tape drive by means of trim, covers and other cosmetic features, which add to the cost of the apparatus. In many installations, the mechanism is protected by doors, which are often transparent, leaving the mechanism exposed and thus subject to aesthetic treatment. Furthermore, the loading of many such magnetic tape drives involve a tedious manual effort. Such manual loading also presents a risk of tape contamination and tape damage as a result of operator handling.

It would therefore be advantageous to have a tape drive unit which would fit into a minimum amount of space, be concealed in use so as not to acquire cosmetic trim, be easy to load and unload, and reduce the risk of tape contamination or damage. One slot loaded, low profile magnetic tape drive is described in U.S. Patent Application Ser. No. 66,792, filed on or about Aug. 15, 1979 and owned by the assignee of the present invention. That unit is constructed in a horizontal configuration to fit in a drawer or similar low profile installation, the tape being loaded and unloaded through a front slot without the need for access through the mechanism. The take-up reel has a vacuum action to retain the tape and it is mounted on an arm which swings back in the enclosure and pulls the tape over a guide and a head array. The supply reel is simultaneously retracted so that the tape and reel are fully enclosed.

Low profile magnetic tape drives which have heretofore been commercially manufactured by others have basically been upright units which have been turned on their side so that complete access to their top has been required. A number of auto-threading magnetic tape drive units have been commercially manufactured by International Business Machines, Inc., and others. Typically they have been upright units which have used a combination of gravity action and a plurality of high pressure jets to guide the tape from the supply reel, past the head assembly, to the take-up reel. Some have utilized a vacuum actuated take-up reel for assisting in the attachment of the free end of the tape thereto. Such units typically require a complex array of manifolds, air conduits, and nozzles. The automatic threading action is subject to malfunction if one or more of the jets is not precisely aimed at the tape to guide it, for example, around a guide roller. Variations in air pressure can also cause malfunctions. Exemplary of such auto-threading magnetic tape drives are U.S. Pat. No. 3,863,863 and the MOD 12 MTU manufactured by Wangco, Inc., 5404 Jandy Place, Los Angeles, Calif., 90066. Auto-threading magnetic tape drives heretofore known have generally utilized compatible cartridges which surround the supply reel and aid in the automatic threading of the free end of the tape. Generally all such units have been constructed to accommodate one reel size, namely the standard ten inch reel.

SUMMARY OF THE INVENTION

It is a primary object of the present invention to provide an improved magnetic tape drive.

It is another object of the invention to provide a magnetic tape drive which has a low profile configuration so that it can be concealed in a horizontal drawer and so that the supply reel can be quickly loaded and unloaded through a front slot.

It is a further object of the present invention to provide a magnetic tape drive in which the free end portion of the tape is automatically threaded and secured to the take-up reel by vacuum action.

Still another object of the present invention is to provide a tape drive of the aforementioned type which is adaptable to standard reels, read/write mechanisms and controls.

Yet another object of the present invention is to provide an improved supply hub for a magnetic tape drive which enables automatic centering of the supply reel on the hub and automatic clamping and unclamping of the supply reel thereto.

In the embodiment disclosed, supply and take-up reels are mounted above a horizontal base for selective powered rotation about respective vertical axes. Vertical guide surfaces and a cover panel define an air tight continuous flowpath extending between the peripheries of the reels past a read/write head. A blower mounted in a hood structure beneath the base sucks air through the flowpath and through a perforated center spool of the take-up reel. A river of air thus pulls and guides the free end portion of the magnetic tape from the supply reel to the take-up reel as the supply reel is rotated by a drive motor to unwind the tape therefrom. The supply hub is adapted to automatically center the supply reel thereon. The supply hub further includes a plurality of annularly spaced reel engaging pawls mounted in, and normally retracted into the hub, and an over-center actuating means for selectively extending the pawls through differential rotation of a pair of separate rotors included in the hub.

BRIEF DESCRIPTION OF THE DRAWINGS

FIG. 6 is an enlarged vertical sectional view taken along line 6—6 of FIG. 4, and illustrating structural details of the supply hub of the tape drive.

FIG. 7 is an enlarged top plan view of the entire supply hub showing further structural details thereof.

FIG. 8 is a vertical sectional view of the supply hub taken along line 8—8 of FIG. 6.

FIG. 9 is a vertical sectional view of the supply hub taken along line 9—9 of FIG. 8, and illustrating the extended position of one of the reel clamping pawls of the supply hub.

FIG. 10 is a vertical sectional view similar to a portion of FIG. 6, and illustrating the retracted position of one of the reel clamping pawls of the supply hub.

DESCRIPTION OF THE PREFERRED EMBODIMENT

Figure 1:
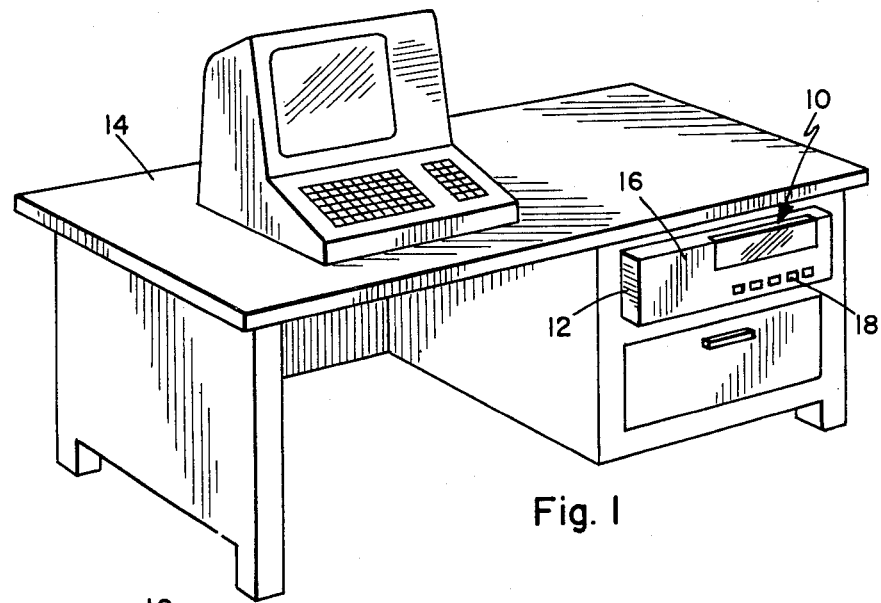
FIG. 1 illustrates a typical desk with the tape drive of the present invention installed.
Figure 2:
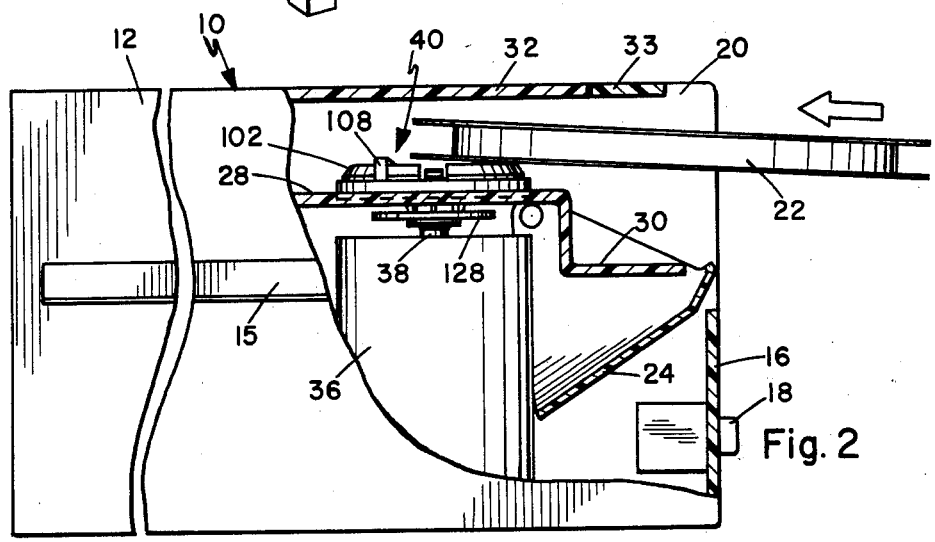
FIG. 2 is a side elevational view of the tape drive of the present invention, partially cut away to show the loading of a supply reel therein.

Referring to FIG. 1, there is illustrated a preferred embodiment 10 of the tape drive of the present invention. It is contained in a housing 12 (FIGS. 1, 2 and 4) constructed as a drawer, which may be installed in a desk 14 (FIG. 1) with any conventional arrangement of slides or guides such as 15 (FIG. 2). The housing has a front panel 16 (FIG. 1) in which the usual controls 18 are mounted. The upper portion of the front panel has a horizontal access slot 20 (FIG. 2) which is positioned and sized to permit a conventional magnetic tape supply reel 22 to be loaded and unloaded therethrough. A door 24 is provided for covering the access slot 20 after the supply reel has been loaded therethrough. A conventional over-the-center spring biased hing assembly 26 (FIG. 4) mounts the door for movement into and out of covering relationship with the slot. Preferably this hinge assembly normally biases the door toward its closed position shown in FIG. 3, and toward its open position shown in FIG. 2 after it has been swung downwardly a predetermined distance. Since the front panel 16 is the only portion of the tape drive normally visible, it alone may be made attractive in appearance as desired. The drawer need not be opened except for servicing when needed.

Figure 4:
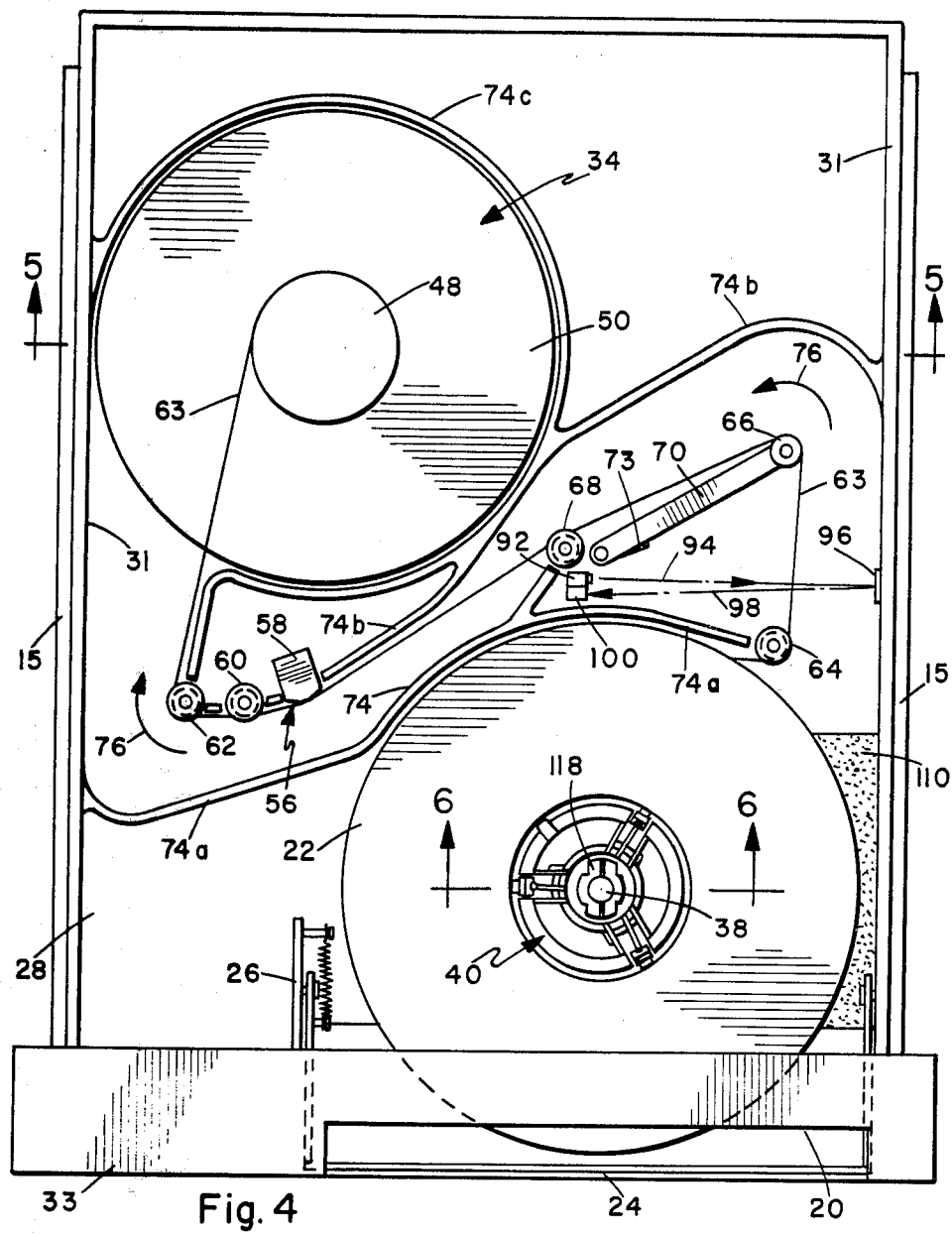
FIG. 4 is a top plan view of the tape drive with its top cover panel removed to show the tape reels and a portion of the structure which enables the free end portion of the tape to be automatically threaded between the reels by vacuum action.

The specific structure of the housing 12 is not critical, but in the arrangement illustrated all of the mechanism is mounted on or secured to a horizontal planar base 28 (FIG. 4). The base is secured in the housing at level which is approximately intermediate the height of the access slot 20 as shown in FIG. 2. A majority of the tape drive actuating mechanism is below the base. The base terminates along its frontal edge in an L-shaped recessed portion 30, which provides sufficient clearance for a user to grasp the supply reel to load and unload the same through the access slot.

Vertical side walls 31 extend along three segments of the perimeter of the housing as shown in FIG. 4. A top cover panel 32 (FIGS. 2, 3 and 5) is spaced above the base 28. This panel is confined within and abuts the side walls 31 and the rearward edge of a top plate 33 (FIGS. 1 and 4) adjoined to the front panel 16. As explained hereafter, the cover panel helps define an air tight flow-path necessary for the automatic threading operation. It may be hinged adjacent its rearward periphery to permit easy access to the tape reels and tape head assemblies, hereinafter described.

Figure 5:
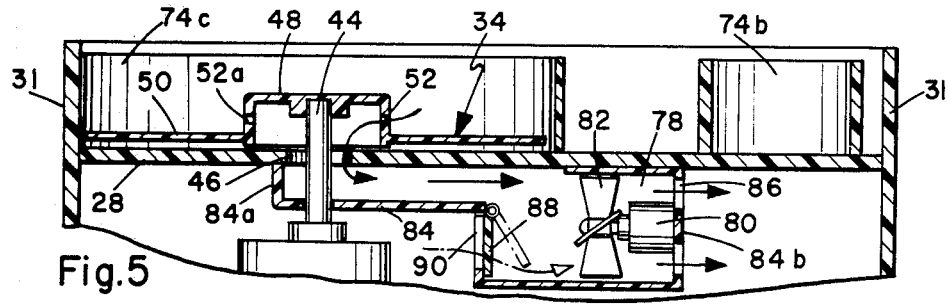
FIG. 5 is a vertical sectional view taken along line 5—5 of FIG. 4, showing further details of the vacuum means which enables automatic threading.

Referring to FIG. 4, means are provided for supporting the conventional supply reel 22 and a take-up reel 34 above and immediately adjacent to the base 28 in side-by-side relationship for rotation about respective vertical axes. As shown in FIGS. 2 and 5, drive means mounted below the base 28 are provided for selectively rotating the reels. Specifically, referring to FIG. 2, an electric motor 36 is mounted beneath the base 28 and has a vertical drive shaft 38 which extends through a hole in the base (not shown in the drawings). A supply hub 40 is mounted on the upper end of the shaft 38. As described later on in greater detail, the supply hub incorporates mechanisms for automatically centering the supply reel thereon and for releasably clamping the supply reel thereto.

Referring to FIG. 5, a second electric motor 42 is also mounted beneath the base 28. It has a vertical shaft 44 which extends through a circular aperture 46 in the base 28. As will become more apparent later on, the aperture 46 must be large enough to permit a significant quantity of air to be sucked therethrough as indicated by the solid arrows in FIG. 5. The take-up reel 34 is mounted on the upper end of the shaft 44. It includes a central spool portion 48 and a flat, relatively large disc portion 50, which supports the magnetic tape would clockwise around the spool during operation. The spool has an annular wall 52 with a plurality of circumferentially spaced perforations 52a which extend therethrough. By sucking air through these perforations, as indicated by the solid arrows in FIG. 5, radially inward suction is provided for attracting and holding the free end portion of a length of magnetic tape threaded to the take-up reel. The supply and take-up motors 36 and 42 are electrically connected to a conventional control system 54 (FIG. 13) which is capable of selectively rotating the reels as is well known in the prior art.

Mounted on top of the base 28 is a tape utilization assembly 56 (FIG. 4), over which the magnetic tape passes. It may include, for example, a read/write head 58, a tachometer 60, which is coupled to a suitable readout to show the amount of tape advanced, and a guide roller 62.

A length of magnetic tape 63 (FIG. 4) is automatically threaded from around the supply reel 22 past guide rollers 64, 66 and 68, past the tape utilization assembly 56 to the take-up reel 34. To maintain tension in the tape, the guide roller 66 is rotatably mounted on the remote end of a tension arm 70 which pivots about a pin 72 secured in the base. The end 73 of a coil spring engages the arm 70 and biases it so that the guide roller 66 tends to swing rearwardly, i.e. away from the door 24. The strength of the spring is selected so that the desired level of operative tension is achieved. Also the guide rollers and the tape utilization assembly are preferably positioned so that during operation of the tape drive, the tape slides over the utilization assembly to permit proper operation of the read/write head 58 and the tachometer 60.

A key feature of the present invention is the utilization of a river of air to accomplish automatic threading of the tape. This river is characterized by relatively low pressure and high flow. Gravity and high pressure directional air jets are not utilized. Broadly speaking, channel means are provided for defining a substantially airtight continuous flowpath between the outer peripheries of the reels and extending past the tape utilization assembly. A river of air is directed through this channel means and carries the free end portion of the magnetic tape 63 from the supply reel to the take-up reel. Specifically, a plurality of walls or guide surfaces 74 (FIG. 4) extend vertically from the base 28. The upper edges of the guide surfaces terminate slightly below the upper edges of the sidewalls 31 as shown in FIG. 5. The top cover panel 32 fits tightly within the rectangle defined by the side walls 31 and the top plate 33 to form substantially airtight regions between the top panel 32 and the base 28. The only openings to these airtight regions are the access slot 20 (FIG. 2) and the aperture 46 (FIG. 5). With the top cover panel 32 in place and the front door 24 open, air sucked through the perforated spool 48 of the take-up reel and through the aperture 46 is drawn through the access slot 20. This air travels in a diagonally extending substantially airtight flowpath 76 between the guide surfaces 74a and 74b as indicated by the arrows in FIG. 4. This continuous river of air is used to guide and pull the free end portion of the magnetic tape from the supply reel 22 to the take-up reel 34.

It will be observed that the guide surfaces 74a and 74b are continuous, i.e. they have no holes or gaps therein except to receive the components of the tape utilization assembly. Thus, air drawn through the perforated spool of the take-up reel creates a continuous flowpath and the free end portion of the tape naturally tends to follow the path of least resistance as the tape is unwound from around the supply reel 22. Thus the tape end is carried by a river of air to the periphery of the take-up reel 34. The guide rollers are positioned so that once the river of air is terminated the rollers will guide the tape between the reels when it is under operative tension and is wound clockwise around each wheel as indicated in FIG. 4.

Once the free end portion of the magnetic tape 63 reaches the periphery of the take-up reel 34, continued feeding of the magnetic tape from the supply reel 22 causes the tape end to contact the semi-circular guide surface 74c. This causes the tape end to curve in a clockwise direction until eventually the radially inwardly directed suction at the supply reel spool 48 causes the tape end to adhere thereto. Thereafter, continued rotation of the supply reel 22 and the take-up reel 34 in a clockwise direction causes the tape to wind about the spool of the take-up reel.

It will be understood that the guide surfaces 74 may be sized and shaped to provide a continuous flowpath having a wide variety of configurations. Since the illustrated embodiment is a low speed tape drive, vacuum columns need not be utilized. They are normally used in high speed tape drives to provide slack in order to accommodate the different acceleration rates of the tape reels and the tape capstan. It is desirable to have a flowpath configuration which will require a minimum amount of space so that the tape drive itself may be made relatively compact. In order to accomplish this objective, the guide walls 74a and 74b are configured and positioned as indicated in FIG. 4 so that a major portion 76 of the overall flowpath extends generally perpendicular to a horizontal line intersecting the axes of rotation of the reels. Thus, in FIG. 4, the flowpath 76 extends diagonally from upper right to lower left relative to the rectangular base 28. This configuration is well suited for the arrangements shown where the tape is wound clockwise around both the supply and take-up reels.

It is also highly desirable that the guide surfaces be curved so that when the free end portion of the magnetic tape contacts the same, a minimum amount of obstruction is imposed against movement in the direction of the flowpath toward the take-up reel. Furthermore, the guide surfaces 74a and 74b should be spaced apart so that the flowpath has a substantially uniform cross-sectional area along its length. This will insure that the air drawn through the channel defined between the guide surfaces 74a and 74b, the base 28 and the top cover panel 32 will flow at a uniform speed or velocity throughout the length of the channel. This insures against dead spaces in the channel or flowpath where the velocity of air would be insufficient to properly guide and pull the free end of the tape.

The present invention further includes vacuum means for sucking air through the flowpath 76 to pull and guide the free end portion of the magnetic tape from the supply reel to the take-up reel as the supply reel is rotated by the motor 36 to unwind the tape. A blower 78 (FIG. 5) is mounted underneath the base 28. It includes an electric motor 80 and an impellar blade structure 82 mounted on the shaft of the motor. Baffle means are provided for permitting the flower 78 to suck air from the flowpath 76 through the perforated take-up reel and through the aperture 46 in the base 28 as indicated by the solid arrows in FIG. 5. The blower 78 is secured to the hood structure 84 which encases the blower. One end 84a of the hood structure communicates with the aperture 46. The opposite end 84b of the hood structure has a plurality of exhaust vents 86 through which air drawn through the hood structure by the blower is expelled.

Valve means are provided for automatically switching the suction path of the blower to draw air from underneath the base 28 to cool the supply and take-up motors 36 and 42 and the electric components of the tape drive. In the illustrated embodiment, this valve means takes the form of a gravity biased flap valve 88, which is hingedly mounted to the hood structure 84 for swinging movement between the positions shown in solid and phantom lines in FIG. 5. The flap valve can swing to open and close an intake port 90 in the hood structure which communicates with the region underneath the base exterior of the hood structure. Before the free end portion of the magnetic tape 63 is automatically threaded to the take-up reel, the weight of the flap valve 88 biases it towards its closed position so that the blower 78 sucks air through the take-up reel as shown by the solid arrows in FIG. 5. Once the free end portion of the tape has been wound around the spool 48 of the take-up reel to cover up the perforations 52a therethrough, the blower can no longer suck air through the take-up reel. The partial vacuum created within the hood structure then causes the flap valve to swing to its open position so that air is drawn through the intake port 90 as indicated by the phantom arrow in FIG. 5. This in turn causes air to flow around the supply and take-up electric motors and the electronic components of the tape drive mounted beneath the base, thus cooling the same and insuring lower operating temperatures and longer component life. By this convenient arrangement the same blower which is utilized to create the river of air for automatic threading is utilized to cool the operative components of the tape drive once the automatic threading operation is completed. Furthermore, the shift between the automatic threading modes and cooling modes of the blower occurs automatically.

Various other valve means may be utilized in place of the flap valve 88. For example, differential air pressure across a read valve positioned adjacent the aperture 46 can be sensed and utilized to actuate movable ducts.

Referring again to FIG. 4, the present invention is further provided with sensing means for detecting when the free end portion of the magnetic tape 63 has entered the flowpath 76 during counter-clockwise rotation of the supply reel 22. In the illustrated embodiment, a light emitting diode 92 (FIG. 4) is mounted on the upper surface of the base 28 so its beam 94 can be aimed horizontally at a reflective element 96 affixed on the inner side of one of the side walls 31. Preferably the light emitting diode and the reflective element are positioned so that the beam 94 extends across the beginning of the flowpath 76 which extends between the guide surfaces 74a and 74b. Preferably the beam 94 from the light emitting diode strikes the reflective element 96 at a slight angle so that the reflected beam 98 will strike a photodiode 100 mounted on the base 28 immediately adjacent the light emitting diode. During the loading sequence the supply reel 22 is automatically centered on the supply hub and automatically clamped thereto. Thereafter, during counter-clockwise rotation of the supply reel, the free end portion of the tape will periodically slap against the guide roller 64 and extend into the flowpath 76.

Figure 13:
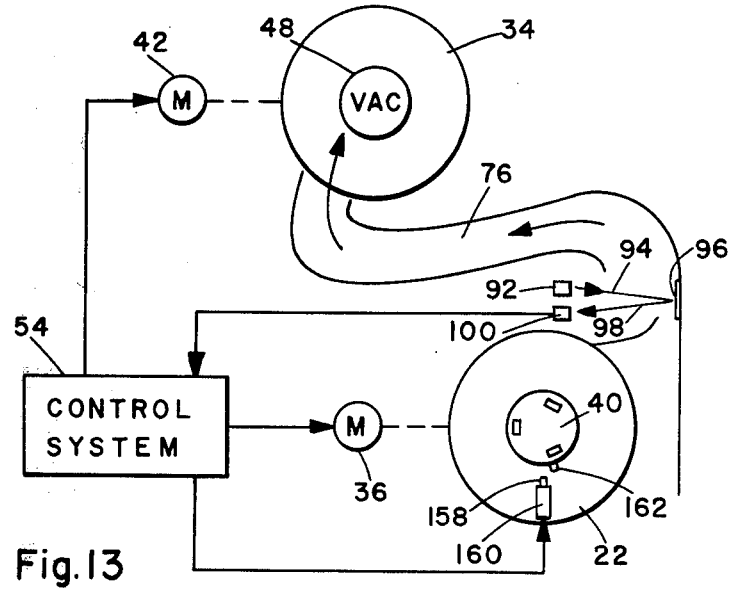
FIG. 13 is a schematic diagram illustrating the operation and control of the tape drive.

The light emitting diode and photodiode are operatively coupled to the control system 54 as shown in FIG. 13. State of the art circuitry can be incorporated into the control system 54 so that the photodiode 100 will detect when the free end portion of the magnetic tape has interrupted the transmission of the beams 94 and 98. This will cause a signal to be sent to the supply motor 36 to reverse the rotation of the supply reel 22 and cause it to rotate in a clockwise direction, thus unwinding the free end portion of the tape. As previously explained, the free end portion of the tape is pulled and guided along the flowpath 76 to take-up reel 60 by the river of air as the tape unwinds from around the supply reel.

Another highly desirable feature of the present invention is that it incorporates means for automatically centering the supply reel on the supply hub. As shown in FIGS. 2 and 4, the supply hub 40 incorporates a raised annular boss portion 102 having a radially inwardly bevelled outer edge 104 (FIG. 6). The configuration of the boss is adapted to facilitate the insertion of the spool 106 of the supply reel into concentric surrounding relationship with the boss portion as shown in FIG. 6.

As shown in FIGS. 2, 6 and 7, a single generally wedge-shaped lobe 108 extends vertically from the annular boss portion 102. When the supply reel is loaded through the access slot as shown in FIG. 2, the operator need not manually center the same, that is to say the operator does not have to manipulate the supply reel so that the spool 106 slides downwardly into interfitting relationship around the boss portion of the hub. The operator merely slides the supply reel through the access slot until further rearward movement thereof is prevented by the guide surface 74a (FIG. 4). Typically when this is done, the spool of the supply reel will be laterally offset somewhat from the hub so that a portion of the supply reel will rest on the hub while a portion of the outer periphery of the reel will rest on the base 28. Thus, if the operator were to look through the access slot, he or she would observe that the supply reel would not be centered on the hub and would instead be restng in an inclined, non-horizontal position.

A layer of high friction material, such as synthetic rubber or sandpaper 110 (FIG. 4), may be affixed with suitable adhesive to the base 28 in an area directly beneath the periphery of the supply reel. When the supply reel rests in an inclined position, as previously indicated, the hub 40 can be rotated at a predetermined speed depending upon the reel size so that it will begin to gyrate. The lobe 108 will engage the inner wall 112 (FIG. 6) of the supply reel spool and begin to rotate the supply reel. The vertical axis of the supply reel will rotate about the vertical axis of the supply hub. Within a very few revolutions of the supply hub, the frictional engagement between the periphery of the supply reel and the frictional layer 110 will result in a difference in rotational speed between the supply reel and the hub. Eventually the inclined portion of the lobe 108 (FIG. 6) will ride over the inner edge of the supply reel spool causing the supply reel to move into a horizontal position and the spool to fall into concentric relationship about the boss portion 102 of the hub.

Figure 3:
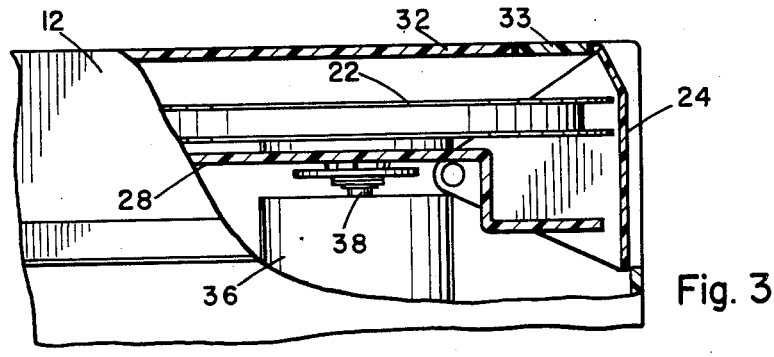
FIG. 3 is a view similar to a portion of FIG. 2, with the supply reel loaded and centered on the supply hub and with the access door closed.

Alternatively, once the supply reel has been inserted through the access slot, the supply motor 36 can be pulsed by the control system 54 to cause intermittant counter-clockwise rotation of the supply hub. The relative difference in rotational inertia between the supply reel and the supply hub will facilitate the action of the lobe 108 in centering the spool of the supply reel about the boss portion of the hub. This arrangement eliminates the necessity of utilizing the layer 110 of frictional material. Once the supply reel has been automatically centered on the supply hub, as shown in FIG. 3, the control system then proceeds with the automatic threading operation.

Yet another advantageous feature of the present invention is the incorporation of novel clamp means on the supply hub for releasably securing the supply reel thereto. FIGS. 6-12 illustrate in detail the construction of the supply hub 40 and the manner in which it automatically clamps the supply reel thereto. The supply reel must be clamped to the supply hub so that a positive drive is established for precisely controlling the rotation of the supply reel during the automatic threading operation and during the normal read/write operation of the tape drive.

Referring to FIG. 6, the supply hub includes a main rotor 114 having a central sleeve portion 116 which surrounds the motor shaft 38 and is rigidly secured thereto by clamp assembly 118 (FIG. 7). The main rotor further has a circular base plate 120 (FIG. 6) having a vertical annular flange 122 connected to its outer edge. The annular boss portion 102 is configured in the form of a ring and three pairs of radially extending fins 124 spaced 120° apart connect the boss portion to a mounting ring 126 which is snap fit over the upper end of the rotor sleeve portion 116.

A smaller rotor 128 (FIG. 6) is fit loosely over the sleeve portion 116 beneath the base plate 120 and is capable of rotating relative to the main rotor. The smaller rotor 128 rides against a standard ball bearing ring assembly 130. This assembly in turn rides on a washer 132 which is biased upwardly by a pair of resilient wave spring washers 134 held against downward movement by a washer 136 abutted against stops 138. By this arrangement, the smaller rotor 128 is urged upwardly against the base plate 120 of the main rotor and may be pushed downwardly to compress the wave spring washers by a suitable amount of downward force applied by three connecting rods 140 (FIGS. 6 and 7).

The supply hub 40 is further provided with three annularly spaced supply reel engaging pawls 142 which are mounted in the base plate 120 of the main rotor and are normally retracted into the hub. As shown in FIGS. 6 and 7, the lower ends of the pawls are received in corresponding rectangular openings in the base plate 120 which are in alignment with the fins 124 so that the pawls can pivot in the openings in the base plate, between the fins of the respective pairs. Pivot pins 144 extend horizontally through the lower ends of the pawls. As shown in FIGS. 8, 9 and 10, the opposite ends of the pivot pins 144 are snap fit into fork-like mounting brackets 146 integrally formed with the fins 124.

The connecting rods 140 have pivot balls 148 and 150 integrally formed therewith at their upper and lower ends respectively. The upper pivot balls 148 are seated in conformably shaped recesses formed intermediate the height of the pawls as shown in FIG. 6. The upper pivot balls are held in position by springy retainer clips 152 (FIGS. 7 and 8) which are connected to the pawls in any suitable fashion. For example, if the pawls are made of plastic they may be connected during the molding operation prior to the insertion of the connecting rods. The lower pivot balls 150 of the connecting rods are received in socket-like recesses formed in the smaller rotor 128 as shown in FIG. 6. The lower pivot balls of the connecting rods are received in recesses 154 (FIGS. 6, 11 and 12) formed in the upper side of the smaller rotor 128. These recesses are generally rectangular in configuration and are angularly positioned so that the connecting rods can shift roughly 90° in position as shown by comparing FIGS. 11 and 12. The lower pivot balls of the connecting rods are retained in the recesses by springy retainer clips 156.

Figure 11:
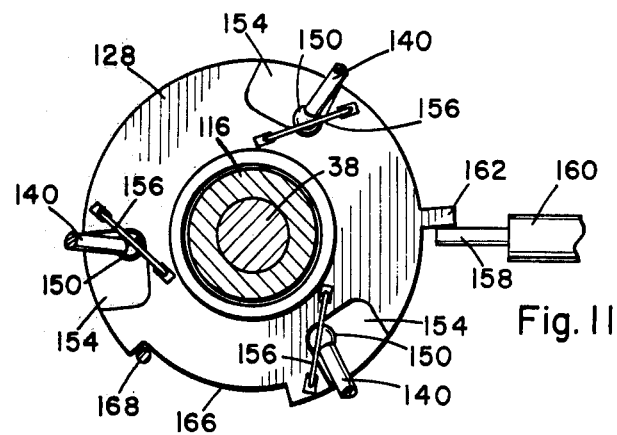
FIG. 11 is a horizontal sectional view taken along line 11—11 of FIG. 6, and illustrating the relative positions of connecting rods of the supply hub when the hub is in its reel clamping mode.
Figure 12:
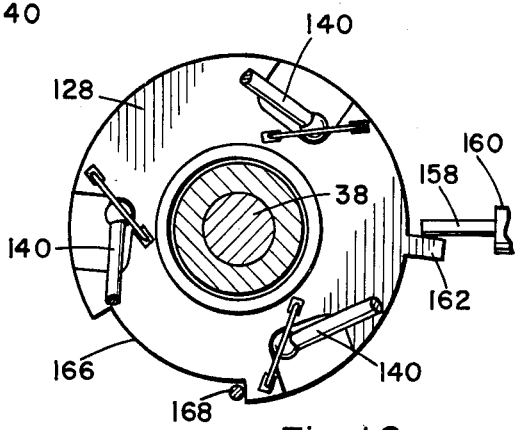
FIG. 12 is a view similar to FIG. 11, but instead illustrating the relative positions of the connecting rods of the supply hub when the hub is in its unclamped mode.

From the foregoing description of the mechanical structure of the supply hub 40 taken in conjunction with FIGS. 6-12, it will be understood that an over-center actuating means is provided for selectively extending and retracting the pawls through differential rotation of the main rotor 114 and the smaller rotor 128. Specifically, normally the pawls 142 are in their retracted positions as indicated in FIG. 10. In this condition, the relative rotational position of the smaller rotor 128 relative to the main rotor 114 is such that the connecting rods 140 are positioned as indicated in FIG. 12. It will be understood that when the connecting rods 140 are somewhat tangentially directed as shown in FIG. 12 they extend a lesser distance radially than when positioned and directed as shown in FIG. 11. In order to automatically pivot the pawls to their extended positions as indicated in FIGS. 6 and 9, the connecting rods must be moved so that they are directed more or less radially outwardly as shown in FIG. 11.

The upper portions of the pawls are provided with compressible friction pads 157 which are made of a suitable deformable material such as a synthetic rubber. As shown in FIGS. 6 and 9, when the pawls are moved to their extended positions these friction pads engage and are compressed against the inner wall 112 of the supply reel spool. In order to move the pawls to their extended position to clamp a reel to the supply hub, the hub is rotated in a clockwise direction. The actuating rod 158 of a solenoid 160 secured to the underside of the base 28 is extended in response to a signal transmitted by the control system 54 (FIG. 13). This rod engages a stop 162 (FIGS. 6, 11 and 12) which extends radially from the smaller rotor 128. This immediately and abruptly terminates the rotation of the smaller rotor, however due to the combined rotational inertia of the main rotor 114 and the supply reel loosely carried thereby, the main rotor keeps rotating in a clockwise direction relative to the smaller rotor, causing the connecting rods to swing radially from their positions shown in FIG. 12 to their positions shown in FIG. 11. This in turn causes the pawls 142 to pivot to their extended positions clamping the supply reel to the supply hub. It will be observed that in the clamped condition shown in FIG. 11, the connecting rods 140 extend slightly tangentially, i.e. off center from radii extending through the center of rotation and through the centers of the lower pivot balls 150. The friction pads 157 (FIG. 6) are compressed. Any tendancy for the supply hub to return to its unclamped condition is resisted since the pads would have to be significantly compressed in order for the connecting rods to pass "over-center" and return to their positions shown in FIG. 12.

Automatic unclamping is performed in a converse manner. Namely, the supply hub and supply reel are rotated in a counter-clockwise direction and the actuating rod of the solenoid is extended to engage the stop 162. Continued rotation of the main rotor and supply reel in a counter-clockwise rotation relative to the smaller rotor 128 causes the connecting rods to swing generally inwardly from their positions shown in FIG. 11 to their positions shown in FIG. 12. This causes the pawls to pivot inwardly resulting in the unclamping of the supply reel. Naturally the actuating rod of the solenoid is retracted during the auto-threading and normal read/write operation of the tape drive.

The base plate 120 (FIG. 7) has cut-outs 164 which provide sufficient clearance for the connecting rods to move to their positions shown in FIG. 12. Also, the smaller rotor 128 (FIGS. 11 and 12) has a circumferentially extending notch 166 cut in its outer edge in which a vertically extending stop pin 168 travels. This notch has a predetermined length which limits the amount that the main rotor 114 can rotate relative to the smaller rotor 128. This prevents over-rotation of the main rotor relative to the smaller rotor during the clamping and unclamping operation, which might otherwise pull the lower pivot balls 150 of the connecting rods out of the recesses 154.

Having described in detail a preferred embodiment of the tape drive of the present invention, the overall loading, automatic threading, and unloading operations can now be described. First the spring loaded door 24 (FIG. 1) is opened and the controls 18 are operated to place the tape drive into its "power on" mode. The blower 78 is automatically started which causes the river of air to flow through the flowpath 76. At the same time, the take-up motor 36 is automatically actuated to cause the supply hub 40 (FIG. 2) to rotate in a counter-clockwise direction. The supply reel 22 having the magnetic tape 63 wound thereabout is slid through the access slot 20 until it overlies the supply hub 40. Thereafter, counter-clockwise rotation of the supply hub 40 causes the supply reel to be automatically centered on the hub.

After a predetermined amount of time has elapsed, the control system 54 (FIG. 13) reverses the supply loader 36 so that the supply reel 22 rotates in a clockwise direction at a predetermined relatively slow speed. Thereafter, the control system actuates the solenoid 160, causing its actuating rod 158 to extend and engage the stop 162 of the supply hub 40. This causes the pawls of the hub to swing to their extended positions, thus clamping the supply reel to the hub. It will be understood that during the automatic clamping operation the supply reel and supply hub are rotated the minimum distance (i.e., one revolution) which will permit the relative rotation of the rotors 114 and 128 necessary to swing the pawls into their extended positions. Undue rotation of the supply reel during this clamping operation could cause an undesired amount of the magnetic tape to unwind from around the supply reel.

After another predetermined time interval, the control system again reverses the supply motor 36 to cause counter-clockwise rotation of the supply reel. The free end portion of the tape thus flaps around in circular fashion. Preferably the supply reel is not rotated at too great of a speed at this point so that a sufficient length of tape will extend away from the periphery of the reel to enable it to flap past the guide roller 64 and past the reflector element 96. With the light emitting diode 92 actuated, the control system awaits a signal from the photodiode 100 which indicates that the free end portion of the tape has entered the beginning of the major portion of the flow path 76. As soon as this signal is received by the control system it immediately reverses the supply motor 36, causing the free end portion of the tape to unwind from the supply reel. The end of the tape is pulled and guided through the flowpath 76 between the guide surfaces 74a and 74b (FIG. 4) as it is unwound from around the supply reel. Eventually the free end of the tape is sucked against the perforated spool 48 of the take-up reel 34.

When the control system causes the supply reel to rotate in a clockwise direction during the automatic threading operation, it also actuates the take-up motor 42 to commence clockwise rotation of the supply reel 34. The free end of the tape is wound about the take-up reel spool which seals off the perforations 52a (FIG. 5) therethrough, terminating the flow of air through the flowpath 76 and commencing the flow of air underneath the base to cool the motors and electronic components of the tape drive.

The tape drive may now be operated to read and write data from the tape. When it is desired to unload the tape from the tape drive, the supply and take-up motors are actuated by the control system to rewind the magnetic tape around the supply reel. This is done at fairly high speed. When the photodiode 100 detects that the free end of the tape has passed the reflective element 96, the control system causes the supply motor 36 to reduce the speed of rotation of the supply reel 22. Referring to FIG. 13, the control system again actuates the solenoid 160, causing its actuating arm 158 to extend and engage the stop 160 of the supply hub. This causes the pawls of the hub to move to their retracted positions, thus unclamping the supply reel from the hub. The operator can then open the door 24 and remove the supply reel and the magnetic tape rewound thereabout. It should be noted that during the clamping and unclamping operations, the hub 40 is rotated at relatively low speeds in comparison to the speed at which the supply reels are rotated during the read/write operation of the tape drive.

Having described a preferred embodiment of our tape drive, it will be apparent that the invention permits of modification in both arrangement and detail. However, the invention should be limited only in accordance with the scope of the following claims.

Having described our invention, we now claim:

1. An auto-threading low profile magnetic tape drive comprising:
    a housing having a substantially horizontal base;
    means for supporting a supply reel above the base for rotation about a substantially vertical axis, the supply reel having a length of magnetic tape wound thereabout terminating in a free end portion;
    means for supporting a take-up reel above the base for rotation about a substantially vertical axis;
    drive means mounted below the base and operatively coupled to the supporting means for selectively rotating the reels;
    a tape utilization assembly including at least a tape reading head, the assembly mounted on the base between the peripheries of the reels;
    channel means for defining a substantially airtight continuous flowpath between the peripheries of the reels and extending past the tape utilization assembly; and
    vacuum means for sucking air through the flowpath to pull and guide the free end portion of the tape from the supply reel to the take-up reel as the supply reel is rotated by the drive means to unwind the tape therefrom.

2. The tape drive of claim 1, wherein the channel means includes:
    a plurality of guide surfaces which extend generally vertically from the base; and
    a cover panel which rests on top of the guide surfaces.

3. The tape drive of claim 1, wherein the vacuum means includes:
    a blower;
    a take-up reel with a spool having an annular wall with perforations therethrough; and
    baffle means for permitting the blower to suck air through the flowpath and through the perforations in the spool.

4. The tape drive of claim 3, wherein the baffle means includes valve means for automatically switching the suction path of the blower to draw air from underneath the base to cool the drive means once the free end portion of the tape is wound about the spool of the take-up reel.

5. The tape drive of claim 2, wherein:
    the guide surfaces are curved and positioned so that a major portion of the flowpath extends generally perpendicular to a horizontal line intersecting the axes of the supporting means and so that the flowpath has a substantially uniform cross-sectional area along its length.

6. The tape drive of claim 5, and further comprising roller means positioned adjacent the flowpath for guiding the tape when it extends between the reels under operative tension and when it is wound clockwise around each reel.

7. The tape drive of claim 1, wherein the housing has a front panel with an access slot positioned and sized to permit a supply reel to be slid therethrough onto the supply reel supporting means, a door for covering the slot, and means for hingedly mounting the door for movement into and out of covering relationship with the slot.

8. The tape drive of claim 1, wherein the supply reel supporting means includes:
a supply hub; and
clamp means on the supply hub for releasably securing the supply reel thereto.

9. The tape drive of claim 8, including means for automatically centering the supply reel on the hub.

10. The tape drive of claim 9, wherein the clamp means includes a plurality of annularly spaced reel engaging pawls mounted in and normally retracted into the hub, and an over-center actuating means for selectively extending and retracting the pawls through differential rotation of a pair of separate rotors included in the hub.

* * * * *